C. H. YOUNG, Jr.
STUFFING BOX.
APPLICATION FILED JUNE 1, 1916.

1,284,538.

Patented Nov. 12, 1918.

Inventor
Charles H. Young Jr.
by his Attorneys
Howson & Howson

UNITED STATES PATENT OFFICE.

CHARLES H. YOUNG, JR., OF WAYNE, PENNSYLVANIA.

STUFFING-BOX.

1,284,538.

Specification of Letters Patent.

Patented Nov. 12, 1918.

Application filed June, 1 1916. Serial No. 101,122.

*To all whom it may concern:*

Be it known that I, CHARLES H. YOUNG, Jr., a citizen of the United States, and a resident of Wayne, county of Delaware, State of Pennsylvania, have invented certain Improvements in Stuffing-Boxes, of which the following is a specification.

My invention relates to stuffing-boxes, designed especially for rotary fire pumps but applicable to all types of rotary, centrifugal and piston pumps and to marine shafting.

In stuffing-boxes of the ordinary type, it has been found necessary to thread some portion of the main casting, such as the cylinder head. These threads are subject to wear and once worn the cylinder head must be replaced or rebored.

One object of my invention is to make a stuffing-box in which the parts subject to the greatest wear, those having threads, are small and independent and can be easily replaced. Another object is to form a stuffing-box which is small, compact, and efficient and which can be readily set up and manipulated.

Figure 1:
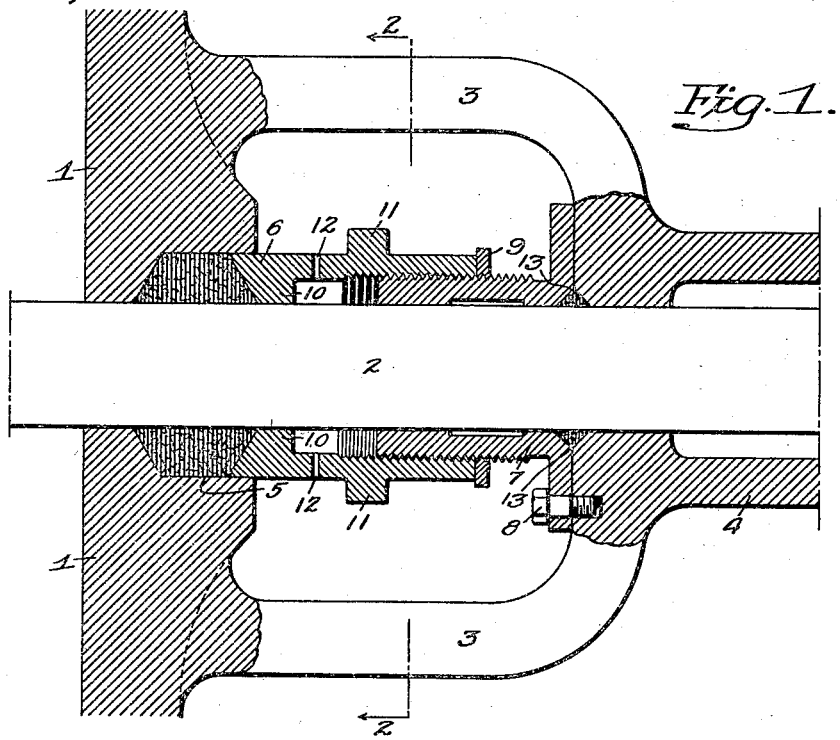
Figure 2:
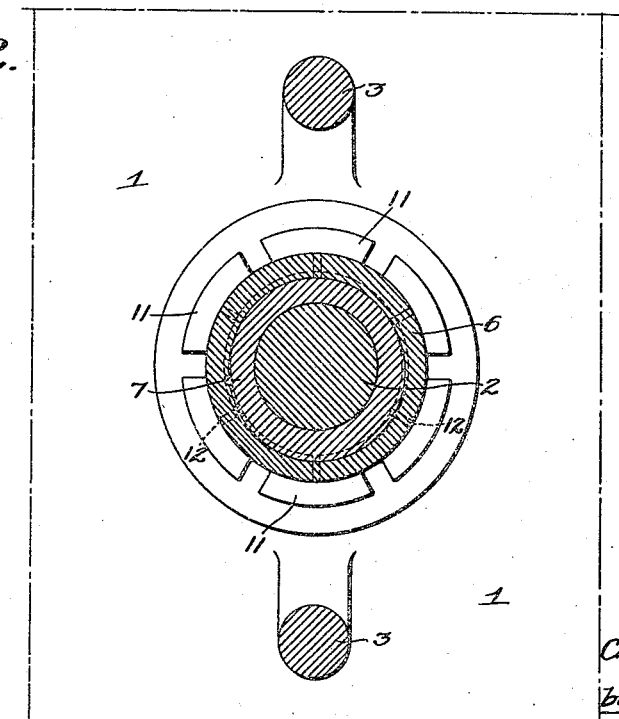

In the accompanying drawings, Figure 1 is a sectional elevation of the stuffing-box, and Fig. 2 is a section taken on the line 2—2, Fig. 1.

In the drawings, 1 is a part of the pump body through which the shaft 2 passes, the cylinder head for instance. From the body portion 1 extend two arms 3—3 which form a yoke the outer end of which carries a bearing 4. In the present instance the arms are made integral with the body but may be made separate and bolted thereto.

5 is a cup shaped recess in the body portion 1, in which is located any suitable packing. Arranged to fit snugly into the recess is a gland 6 which entirely surrounds the shaft and which is carried on a sleeve 7, the sleeve being removably attached to the inner side of the yoke 3. Between the sleeve and the yoke there is a small recess 13 for the reception of packing to keep the bearing free from moisture.

The gland 6 has at its forward end an inwardly projecting flange 10 which fits neatly around the shaft. The face of the flange is beveled, as shown, so as to coöperate with the beveled base of the recess 5 in forcing the packing onto the shaft. The rear portion of the gland 6 has an internal thread which meshes with a thread on the sleeve 7. This sleeve 7 fits the shaft and has a flange at the back which rests against the inside of the yoke 3 and which is prevented from turning by means of one or more set screws or other device. The gland 6 has a notched annular rib 11, in the present instance, to receive a spanner when it is desired to turn the gland. The rib may be shaped to receive any type of wrench or other tool. There should be one or more small holes 12 in the bushing to permit a free passage of air from the hollow portion of the gland when it is screwed back on the sleeve. The sleeve 7 carries a locknut 9 which holds the gland 6 firmly in the desired position. Other means of fastening the gland in the position to which it is adjusted may be used if desired.

To introduce the packing to the box, the locknut is loosened and both it and the gland 6 are screwed back on the sleeve 7. The packing is then placed in the recess 5 and the gland advanced until the desired degree of tightness is obtained. The bushing is then locked by means of the locknut.

It will be noticed that there are no threads in the pump body and that all the threaded parts are small and can be replaced easily and at little expense. There is also in this stuffing-box no tendency for the parts to get out of line and bind on the shaft. Since the gland 6 completely surrounds the shaft, it may be manipulated without danger while the shaft is moving.

While I have described my invention in connection with a rotating shaft, it will be understood that it may be used with a reciprocating rod, such as a piston or valve rod, without departing from the spirit of the invention.

I claim:

In a stuffing-box, the combination with a body having a recess therein, of a yoke on said body, a threaded sleeve, having a flange thereon, removably attached to said yoke, a gland threaded internally to engage the threads on said sleeve, packing located in the recess of the body, a shaft extending through the several parts, the yoke acting as an abutment when the gland is adjusted to compress the packing in the recess.

CHARLES H. YOUNG, JR.

Copies of this patent may be obtained for five cents each, by addressing the "Commissioner of Patents, Washington, D. C."